Sept. 5, 1939.  E. D. WILKERSON  2,171,616
VEHICLE WHEEL TESTING INSTRUMENT
Filed Sept. 4, 1936  3 Sheets-Sheet 1
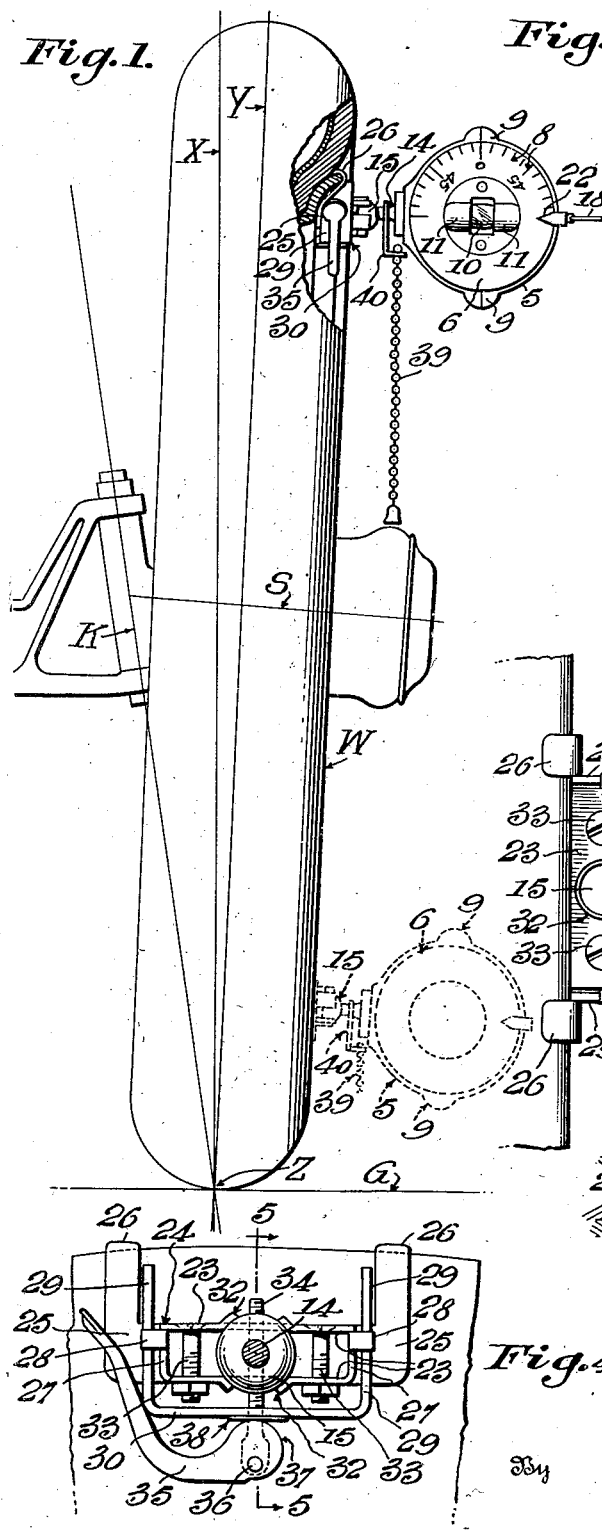
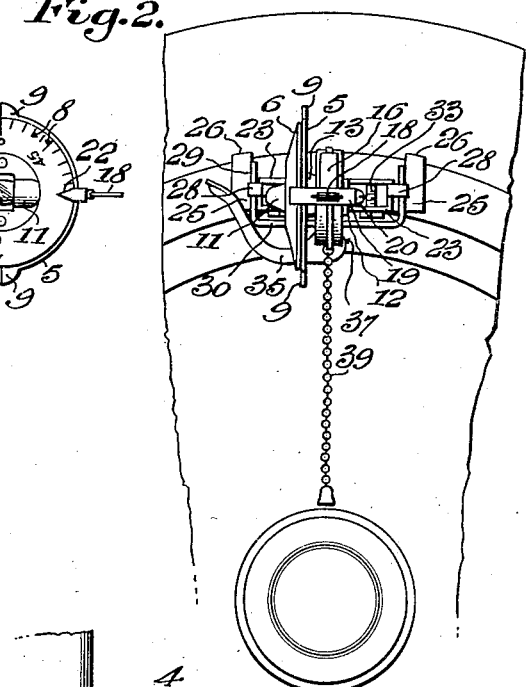
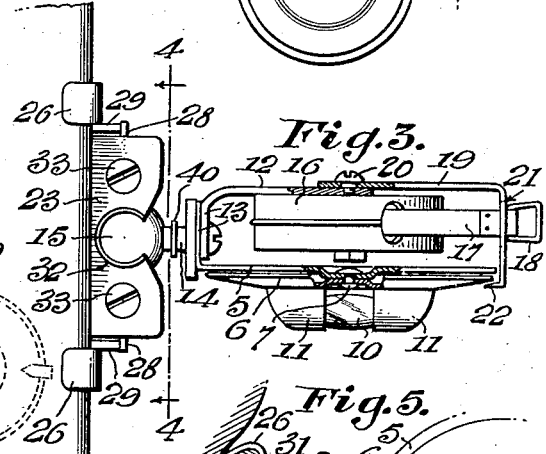
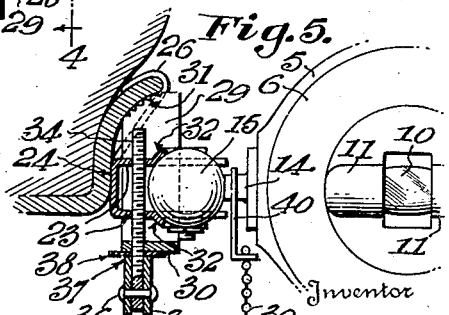
Inventor
Edward D. Wilkerson, Sept. 5, 1939.   E. D. WILKERSON   2,171,616
VEHICLE WHEEL TESTING INSTRUMENT
Filed Sept. 4, 1936   3 Sheets-Sheet 2
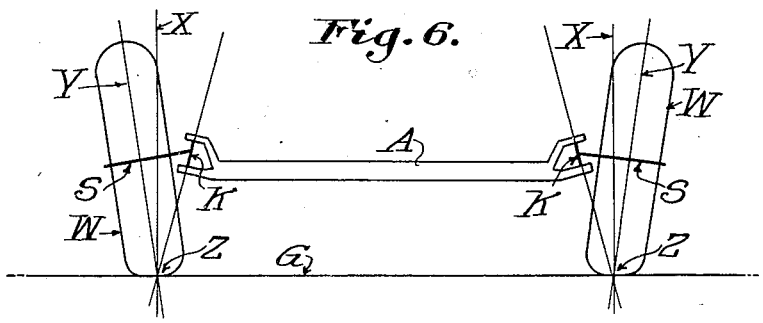
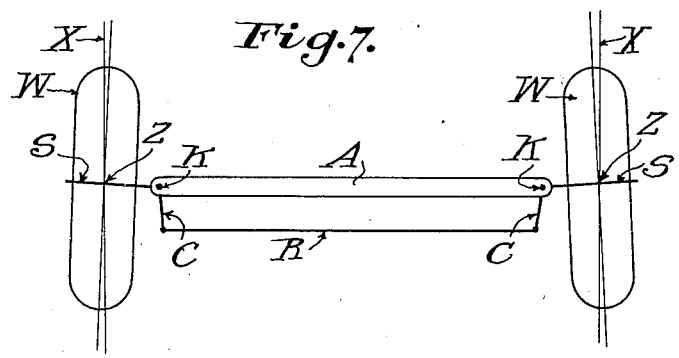
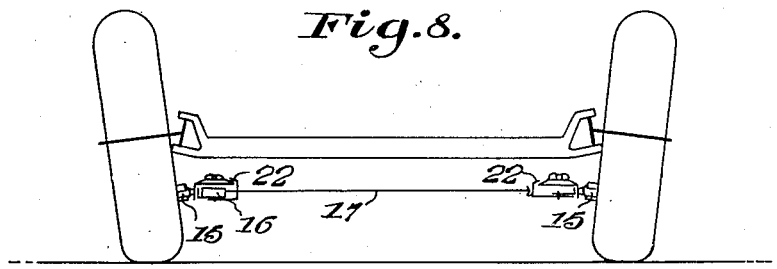
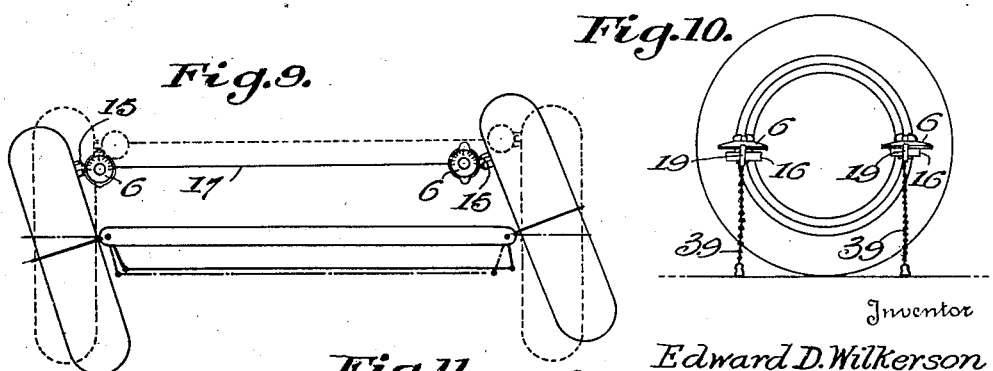
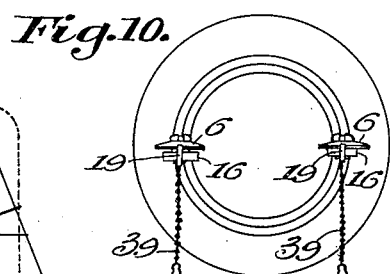
Inventor
Edward D. Wilkerson
BY Chas. J. Diller
Attorney Sept. 5, 1939.　　　　　E. D. WILKERSON　　　　　2,171,616
VEHICLE WHEEL TESTING INSTRUMENT
Filed Sept. 4, 1936　　　　3 Sheets-Sheet 3
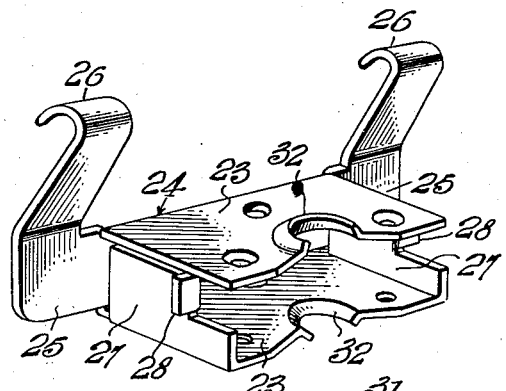
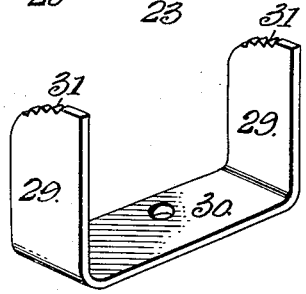
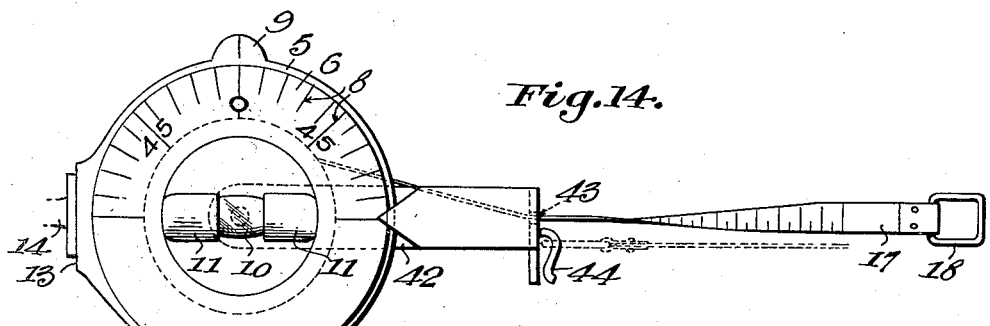
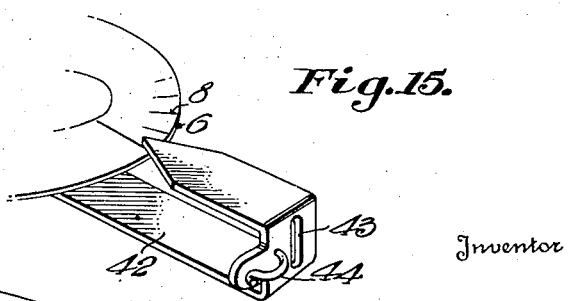
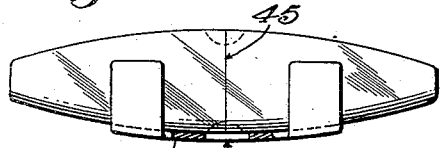
Inventor
Edward D. Wilkerson,
By
Attorney Patented Sept. 5, 1939

2,171,616

UNITED STATES PATENT OFFICE 2,171,616

VEHICLE WHEEL TESTING INSTRUMENT

Edward D. Wilkerson, Orange, N. J.

Application September 4, 1936, Serial No. 99,484

19 Claims. (Cl. 33—203)

The invention relates generally to vehicle wheel testing apparatus and has for an object to provide a novel and extremely simple instrument adapted for use in the making of all such tests as are essential to initial determination and constant maintenance of proper wheel positioning.

It is well known that the wheels of modern day automobiles are postioned in accordance with certain standards determined by the respective manufacturers as adapted for the most efficient road performance. These standards include camber, caster, king pin inclination, toe-in and steering geometry. All of these factors are important and so interrelated that when one of said factors is inaccurate, the other factors are affected thereby, and sometimes a slight variation in one of said factors results in magnified inaccuracy in one or more of the other factors.

In its more detailed nature therefore, the invention resides in the provision of a novel, extremely simple device having provision for the clamping thereof upon an edge of the rim of a wheel, at a single point in its circumference, and instrumentalities adapting the device to the making of tests relating to camber, caster, king pin inclination, toe-in and steering geometry.

With these and other objects in view which will hereinafter appear, the invention further resides in the novel details of construction, combination and arrangement of parts, all of which will be first fully described in the following detailed description, then be particularly pointed out in the appended claims, reference being had to the accompanying drawings, in which:

Figure 1 is a detail front elevation and part vertical section illustrating an automobile wheel and one of my improved testing units mounted thereon.

Figure 2 is a fragmentary side elevation of the wheel and testing unit shown in Figure 1.

Figure 3 is a detail plan view of the unit positioned as shown in Figure 2.

Figure 4 is a detail vertical section taken on the line 4—4 on Figure 3.

Figure 5 is a detail vertical cross section taken on the line 5—5 on Figure 4.

Figure 6 is a diagrammatic front elevation illustrating the front or steering wheels of an automobile.

Figure 7 is a diagrammatic plan view of the parts shown in Figure 6.

Figures 8 and 9 are diagrammatic front and plan views illustrating two units mounted upon the respective opposed wheel rims and cooperatively connected by the tape line.

Figure 10 is a diagrammatic inside face view illustrating movements of the devices when connected as shown in Figures 8 and 9.

Figure 11 is a detail edge view of the companion unit not equipped with a tape line.

Figure 12 is a detail perspective view of the horizontal U-shaped clamping member.

Figure 13 is a detail perspective view of the vertical U-shaped clamping member.

Figure 14 is a detail plan view illustrating a modified form of pointer, tape line and guide arrangement.

Figure 15 is a detail perspective view of the pointer shown in Figure 14.

Figure 16 is a detail view illustrating a level equipped with a movable sight or locator.

In the drawings in which like reference characters indicate like parts in all of the figures, 5 designates the base plate of my improved testing device and 6 the dial plate which is rotatably secured to the base plate as indicated at 7.

The dial plate is graduated in degrees as indicated at 8 throughout 180° of the circumference thereof, the graduations being divided into two groups of 90° each directed oppositely from a centrally disposed zero indication adapted for cooperation with one or the other of the diametrically oppositely disposed zero or setting pointers 9 with which the base plate 5 is provided. See Figure 1. A spirit level 10 is secured at 11 to move with the rotatably adjustable dial plate 6 for a purpose that will become apparent as the description progresses.

A bracket arm 12 is opposed to base plate 5 in spaced relation, and this arm and the base plate have angle bent ears 13 which are secured together and to a shank 14 extending from a mounting ball 15 as shown in Figure 3. The ball 15 forms a part of a novel universal mounting for the base plate and dial as will later become apparent.

A tape line casing 16 is rigidly secured in any approved manner to the bracket arm 12, and the tape line 17 thereof passes through a suitable opening in the casing and has its free end equipped with an eye 18. The pointer arm 19, pivotally secured at 20 to the bracket arm 12, is provided at its free end with a slot 21 through which the tape passes, and with a pointer 22 which overlies the edge of the dial plate 6 for cooperation with the graduations formed on said edge.

The mounting ball 15 is frictionally held between upper and lower plates 23 forming the legs of a horizontal U-shaped clamp member 24 having end extensions 25 shaped to form mounting hooks 26 adapted to overlie and grip a wheel rim edge in the manner shown in Figures 4 and 5 of the drawings. The end extensions 25, the end walls 27 bent vertically in parallel relation from the lower plate 23, and the ears 28 bent laterally from said walls form vertical guideways for the vertical legs 29 of the U-shaped clamping member 30. The ends of the legs 29 preferably are serrated or roughened at 31 to better grip the wheel rim edge in opposition to the clamping hooks 26 as shown in Figure 5.

Each plate 23 is provided with a generally circular seat 32 for engaging the mounting ball 15 at opposite sides, and these plates may be made to grip the ball with a desired degree of frictional contact by screw bolts 33. See Figure 4. By reason of this equipment the testing unit comprising the base plate 5, the dial 6 and the tape can be moved to any desired position by the testing operator and will be retained in that position until it is again intentionally moved during the making of a test.

An adjustment screw 34 is adjustably threaded through the U-shaped member 24, 23, and through the base of the U-shaped member 30, 29 as shown in Figures 4 and 5. To the lower end of the screw 34 a clamp arm 35 is pivotally secured as indicated at 36. This arm includes eccentric clamping edges 37 which engage a thrust washer 38 disposed between said edges and the base of the U-shaped member 30, 29. By moving the arm 35 to the position shown in Figure 4 of the drawings the clamping hooks 26 and legs 29 will be caused to move toward each other and grip the wheel rim edge therebetween. The arm has a definite, constant maximum clamping throw but by adjustment of the screw 34 it is possible to vary the spacing of the hooks 26 and the clamping legs 29 and thus quickly adapt the device to use upon any size of wheel rim.

A sight chain 39 is freely suspended as at 40 from the ball shank 14 as shown in Figures 1 and 5 and serves the dual function of a plumb bob-like sight and a height indicator in a manner hereinafter described.

The tape line 17 is not necessary in the making of every test and, if desired, the test units may be made in companion pairs, one including the tape line and one without a tape line but having the pointer arm thereof equipped with a tape line eye receiving hook 41. In the making of such tests as demand the use of a tape line a tape line equipped unit and a companion unit such as is shown in Figure 11 may be employed.

I prefer, however, to standardize the units so that no obligation of selection of units will be imposed upon a testing operator. By employment of standardized units any two units may be used in the making of any test requiring the use of two units. When standardized, each unit includes the tape line and each pointer arm 42 is made longer and equipped at its free end with both tape slot 43 and tape eye receiving hook 44. See Figures 14 and 15.

In Figure 16 I have shown a modified and improved form of spirit level including a central marker 45 and a shiftable sight member 46 including a sight opening 47 by employment of which it is possible to make a subsequent test calculation without complication because of the making of a previous calculation as will later be described.

I will now describe the numerous uses to which the invention may be put. The simple device which I have designed as hereinbefore described is capable of testing or determining the amount of camber, caster, king pin inclination, toe-in with wheels straight ahead, toe-out on turns and turning radius of the wheels in relation to each other and in relation to the king pins, spindles and steering arms that are employed in the front assemblies of an automobile. In addition, I am able to test rear wheel toe-in and toe-out or camber in order to determine if the rear axle housing is bent or sprung.

Moreover, in the making of these tests I adhere to the true plane of the wheel, thereby eliminating the possibility of an incorrect reading due to bent wheels, spindles or axles, inasmuch as I employ only one definite spot on the wheel and revolve the wheel in partial turns or until the testing device has reached a point exactly opposite the starting point. This I consider to be essential, as the final result desired is to have the wheel perform a true plane in accordance with specifications.

I have also embodied in my invention a means of gauging the total and final results of the numerous angles by testing the wheels in one simple check to determine if the desired result is present. Heretofore, it was necessary to test most of these angles separately and assume that, if they were as specified, the final result would be present. This practice was erroneous, as the wheels and spindles, as well as various other parts, were moved or revolved between checks and any play or lost motion present would give an improper indication and the final result would not be as intended, even though each individual indication was as specified.

In Figures 6 and 7 I have illustrated, diagrammatically and in more or less exaggerated fashion, a front wheel assembly and the relations of the camber, caster and toe-in arrangements of the wheels. The arrangements of and the necessity for camber, caster, king pin inclination, toe-in and steering geomtry are well known to workers in the art and need not be enlarged upon. The interdependence of these arrangements likewise is well known, and a testing device incapable of making all tests necessary is of very little practical value. In these figures the ground line is indicated at G, the axle at A, the king pin axes at K, the spindle axes at S, the wheels at W, imaginary parallel vertical planes at X, the wheel planes at Y, and the points at which the planes S and Y and the king pin axes K merge are indicated at Z. The relation of spindle cranks C and the connecting radius rod R in Figure 7 represent the arrangement determining the steering geometry.

The camber test

To determine the camber of the wheel the device is clamped to the edge of the wheel rim as shown in Figures 1 to 4 of the drawings, the top center being located by rolling the wheel until the chain 39 acting as a plumb bob locates the center of the wheel hub. The base plate 5 is then adjusted to the vertical position shown in Figures 1 and 2 of the drawings, the dial plate 6 turned until its zero line reading registers with the line indication 9 on the base plate as shown, and then the spirit level bubble is centered by moving the base plate and dial plate as one, the movement being made in the ball joint. The wheel is then turned 180° until the base plate 5 is again vertical at the bottom of the wheel. See dotted lines in Figure 1. The spirit level bubble is then observed to note the change in position thereof and the dial plate 6 readjusted to again center the bubble. The degrees of variation are then noted by comparing the zero mark on the dial plate with the mark 9 on the base plate, the latter having remained stationary during the readjustment of the dial plate. The distance which the dial plate had to be moved to recenter the bubble represents the amount of camber in degrees.

The camber, caster and king pin inclination tests each being based upon 180° of rotation of a wheel the dial plate 6 is marked through 180° of its circumference but in two oppositely directed divisions each running from zero to 90° thus avoiding what would otherwise be a double reading of the true degree of variation.

The spirit level employed in my device preferably is of the double reading or convex type shown in Figure 16 so that it can be read as well after being turned 180° as in its initial setting. Moreover, I preferably employ a block out or sight shield 46, 47 so that a given camber reading may be retained or sighted in a manner avoiding the confusion or compounding thereof with a subsequently made caster reading.

Let us assume that a certain degree of camber is registered during the camber test. During the making of this test the sight shield 46, 47 will have remained in its normal or standard position centered on the line 45 and the bubble will have moved over to the position shown in dotted lines. By moving the shield 46, 47 to center the sight thereof on the bubble the position which the bubble had assumed in the camber test can be held so that when the dial plate is thereafter moved back to zero and a caster test made the movement of the bubble incident to caster alone can be determined without being added to or compounded with the camber condition.

Prior to the making of the caster test the dial plate is reset at the zero position and leveled as above stated.

The caster test

The degree of camber first having been offset by use of the sight slide 46, 47 as above described, the wheel is cut 30°, the plates are set and moved as one on the ball joint to level the bubble, and the wheel is then turned 180° as in the camber test and the variation noted. If there is any variation at this point, incident to the movement of the device from the top to the bottom with the wheel, the sight slide 46, 47 is moved so that the sight opening 47 registers on the bubble thereby removing or blocking out this variation. The wheel is then cut 60° from its present position, or 30° from its initial position, in the opposite direction, and the device set and made level at the top of the wheel as before. By now turning the wheel 180°, again leveling the bubble and noting the variation, indicated by the degree to which the dial plate must be turned to effect the leveling, the amount of caster is determined.

King pin inclination test

After the caster test the wheel is again returned to the straight ahead position. The plates 5 and 6 are set and moved as one on the ball joint to level the bubble at the top of the wheel and the wheel is turned 180°, thus again recording the camber. This camber indication is again blocked out by use of the slide 46, 47 as previously described and the wheel is cut 30° and the procedure of the camber test repeated. The variation is noted at this point and the wheel is then set straight ahead and the plates are reset at zero. The wheel is then cut 30° in the opposite direction and turned 180° and the variation noted. It will be noted that this procedure is almost the same as the caster test, except that the starting point is with the wheel straight ahead, whereas in the caster check the starting point is at 30° off straight ahead. The reading is now noted and this indicates the king pin inclination of this side of the axle. The caster of the king pin has no bearing on the reading, due to the fact that on one check this caster augmented the indication while in the other check it decreased the reading, thereby balancing the number of caster degrees as far as the king pin inclination check is concerned.

Toe-in test

In making this test I employ two of my improved testing units, either companion units as shown in Figure 8, one with and one without a tape line equipment, or the standardized units each having tape line and pointer equipment as in Figures 14 and 15. One unit is clamped at the bottom of each front wheel rim and the tape line of one unit is drawn across from wheel to wheel and the eye 18 thereof attached to the hook 41 or 44 on the pointer arm 19 or 42 of the opposite unit. By now rolling the wheels front and back equal distances, as is readily determined by relation of the sight chains 39 with the ground as shown in Figure 10, it is possible to determine the amount of movement in and out of the tape line by observing the indications on the tape line with relation to the guide slots 21 or 43 through which the tape passes and thus indicate the amount of toe-in of the wheels. By observing the bubbles in the levels 18 carried by the respective dial plates 6, the base plates 5 can be moved about on their universal mountings in order to obtain an initial position in which an untwisted condition of the tape line 17 will be assured. This use of the levels on the pair of test units in determining the proper initial correlation of tape line mountings assures against the obtaining of off readings on the tape due to binding or twisted conditions of the tape line.

Turning radius or steering geometry test

In the making of this test I mount the units as in the making of the toe-in test or as shown in Figure 8 and then roll the wheels so as to present the units forwardly as indicated in Figure 9. The dial plates 6 are positioned with their zero markers alined with the arm pointers 22 or 42, the latter being freely pivoted at the center of the dial so as to be movable over the peripheral edge of said dial. The wheels are then cut as indicated in Figure 9 and the respective pointers moving over the dial plates will indicate the degree to which each wheel turns. This variation may also be checked in inches or fractions thereof by observing the indications on the tape line with relation to the pointer arm slots through which they pass. In preparation for the making of this test the dial and base plates are initially positioned by use of the levels in the same manner and for the same purpose just above described with reference to the making of toe-in tests.

It is of course to be understood that the details of construction and arrangement of parts may be variously changed and modified without departing from the spirit and scope of my invention.

I claim:

1. A wheel test unit comprising a supporting element, means for mounting the element upon a wheel rim edge at a single point in the circumference thereof at the inside or outside face of the wheel, and means movably mounted on said element for indicating conditions of mounting of said wheel, said mounting means including clamping devices movable in opposition for gripping the wheel rim edge therebetween and means for moving said clamping devices.

2. A wheel test unit comprising a supporting element, means for mounting the element upon a wheel rim edge at a single point in the circumference thereof at the inside or outside face of the wheel, and means movably mounted on said element for indicating conditions of mounting of said wheel, said mounting means including clamping devices movable in opposition for gripping the wheel rim edge therebetween, means for varying the spaced relation of the clamping devices to adapt them to use upon wheel rims of various sizes, and means for moving said clamping devices.

3. A wheel test unit comprising a supporting element, means for mounting the element upon a wheel rim at a single point in the circumference thereof, and means movably mounted on said element for indicating conditions of mounting of said wheel, said mounting means including clamping devices movable in opposition for gripping the wheel rim edge therebetween, and an eccentric cam member for moving said clamping devices.

4. A wheel test unit comprising a mounting element having a projected hook member for overlying a wheel rim edge, a clamping element movably supported on said mounting element and movable toward said hook member for gripping said wheel rim edge, a supporting element adjustably mounted on said mounting element, and means movably supported on said supporting element for indicating conditions of mounting of said wheel.

5. A wheel test unit comprising a mounting element having a projected hook member for overlying a wheel rim edge, a clamping element movably supported on said mounting element and movable toward said hook member for gripping said wheel rim edge, a supporting element, ball and socket means for adjustably mounting said supporting element on said mounting element, and means movably supported on said supporting element for indicating conditions of mounting of said wheel.

6. A wheel test unit comprising a mounting element having a projected hook member for overlying a wheel rim edge, a clamping element movably supported on said mounting element and movable toward said hook member for gripping said wheel rim edge, a supporting element, ball and socket means for adjustably mounting said supporting element on said mounting element, means for imposing adjustable friction in said ball and socket mounting, and means movably supported on said supporting element for indicating conditions of mounting of said wheel.

7. In a wheel test unit, a supporting element, means movably supported on said element for indicating conditions of mounting of a wheel, and means for adjustably mounting said element on a wheel-to-be-tested comprising a mounting member having spaced hook-like extensions for overlying the wheel rim edge and a slide guideway, a clamping member slidable in the guideway and having clamping portions presented toward the extensions for clamping the rim edge against said extensions, ball and socket means for supporting said element on said mounting member, and eccentric cam means for moving said clamping member.

8. A wheel test unit comprising a mounting device mountable upon a wheel rim at a single point in the circumference thereof, supporting means adjustably mounted on said device and having an indicator mark thereon, and a dial plate pivotally supported on said means for cooperation with said mark and carrying a level thereon.

9. A wheel test unit comprising a mounting device mountable upon a wheel rim at a single point in the circumference thereof, supporting means adjustably mounted on said device and having an indicator mark thereon, and a circular dial plate rotatably supported on said means and marked in degrees throughout 180° of the circumferential edge thereof 90° in opposite directions at each side of a central zero point for cooperation with said mark and carrying a level thereon.

10. A wheel test unit comprising a mounting device mountable upon a wheel rim at a single point in the circumference thereof, supporting means adjustably mounted on said device and having an indicator mark thereon, and a circular dial plate rotatably supported on said means and marked in degrees throughout 180° of the circumferential edge thereof 90° in opposite directions at each side of a central zero point for cooperation with said mark and carrying a level thereon, said adjustably mounted means including a shank extension and a ball and socket joint connection with said mounting device.

11. A wheel test unit comprising a mounting device having provision for gripping a wheel rim edge at a single point in the circumference thereof, a tape line supported on said device, and a guide and gauge eye supported on said device and through which said tape line passes.

12. A wheel test unit comprising a mounting device having provision for gripping a wheel rim edge at a single point in the circumference thereof, a dial plate adjustably supported on said device and having indicating markings on an edge thereof, a spring coiled tape line supported on said device, and an arm pivotally mounted on said device and having an indicator end overlying and cooperating with said marked edge and a guide and gauge eye through which said tape line passes.

13. A wheel test unit comprising a mounting device having provision for gripping a wheel rim edge at a single point in the circumference thereof, a dial plate adjustably supported on said device and having indicating markings on an edge thereof and a level movable therewith, and an arm pivotally mounted on said device and having an indicator end overlying and cooperating with said marked edge and a tape eye receiving hook.

14. A wheel test unit comprising a mounting device having provision for gripping a wheel rim edge at a single point in the circumference thereof, a dial plate adjustably supported on said device and having indicating markings on an edge thereof and a level movable therewith, a spring coiled tape line supported on said device and having an eye at its free end, and an arm pivotally mounted on said device and having an indicator end overlying and cooperating with said marked edge and a guide and gauge eye through which said tape line passes and a tape eye receiving hook.

15. A wheel test unit comprising a supporting element, means for mounting the element upon a wheel rim at a single point in the circumference thereof, means for universally supporting said element on said mounting means including a shank extension and a ball and socket joint, an indicator chain freely suspended from said shank, and means movably mounted on said element for indicating conditions of mounting of said wheel.

16. A wheel test unit comprising mounting means having provision for gripping a wheel rim edge at a single point in the circumference thereof, a supporting device universally supported on said mounting means through the medium of a shank extension and a ball and socket joint, a dial plate adjustably supported on said device and having indicating markings on an edge thereof and a level movable therewith, a spring coiled tape line supported on said device and having an eye at its free end, an arm pivotally mounted on said device and having an indicator end overlying and cooperating with said marked edge and a guide and gauge eye through which said tape passes and a tape eye receiving hook, and an indicator chain freely suspended from said shank.

17. In a wheel test unit, mounting means, devices shiftable for making a variety of wheel tests and including a level bulb and a sight member shiftable about on said bulb and having a bubble sight opening therein movable at will to register with a bulb bubble position to definitely fix and retain an indication of that position.

18. A wheel test unit comprising a support mountable on a vehicle wheel, a tape line carried by said support, and a guide and gauge eye mounted on said support and through which said tape line passes.

19. A wheel test unit comprising a support mountable on a vehicle wheel, a dial plate adjustably mounted on the support and having indicating markings on an edge thereof, a spring coiled tape line carried by said support, and an arm pivotally mounted on said support and having an indicator end overlying and cooperating with said marked edge and a guide and gauge eye through which said tape line passes.

EDWARD D. WILKERSON.